(12) United States Patent
Azima et al.

(10) Patent No.: US 6,198,831 B1
(45) Date of Patent: *Mar. 6, 2001

(54) PANEL-FORM LOUDSPEAKERS

(75) Inventors: Henry Azima, Cambridge; Martin Colloms, London; Neil Harris, Great Shelford, all of (GB)

(73) Assignee: New Transducers Limited, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,359
(22) PCT Filed: Sep. 2, 1996
(86) PCT No.: PCT/GB96/02163
§ 371 Date: May 13, 1998
§ 102(e) Date: May 13, 1998
(87) PCT Pub. No.: WO97/09847
PCT Pub. Date: Mar. 13, 1997

Related U.S. Application Data

(63) Continuation-in-part of application No. 08/707,012, filed on Sep. 3, 1996.

(30) Foreign Application Priority Data

Sep. 2, 1995 (GB) .................................................. 9517918
Oct. 31, 1995 (GB) .................................................. 9522281
Mar. 30, 1996 (GB) .................................................. 9606836

(51) Int. Cl.[7] .................................................. H04R 25/00
(52) U.S. Cl. .......................... 381/338; 381/191; 381/398; 381/423; 381/431; 381/161; 381/162; 181/172; 181/287; 181/288; 181/292
(58) Field of Search .................................. 381/190, 191, 381/396, 398, 423, 421, 431; 181/172, 287, 288, 292

(56) References Cited

U.S. PATENT DOCUMENTS 4,467,235 * 8/1984 De Wames et al. .................. 310/313

FOREIGN PATENT DOCUMENTS

2010637 * 11/1978 (GB) .............................. H04R/7/06
2 161 672   1/1986 (GB) .

* cited by examiner

Primary Examiner—Curtis A. Kuntz
Assistant Examiner—Dionne Harvey
(74) Attorney, Agent, or Firm—Foley & Lardner

(57) ABSTRACT

A panel form loudspeaker/microphone combination has a distributed resonant bending wave member and two transducers mounred on the member at sites where the number of vibrationally active resonance anti-nodes is relatively high. One transducer is capable of vibrating the member to couple to and excite resonant bending wave modes in the member and cause the member to produce an acoustic output. The other transducer also is capable of coupling to he resonant bending wave modes in the member, but it produces an output signal in response to resonance of the member due to incident acoustic energy. The combination may be part of a loudspeaker system including an amplifier for the source signal coupled to the first transducer, and a signal receiver coupled to the second transducer for treating the output signal.

16 Claims, 4 Drawing Sheets

PANEL-FORM LOUDSPEAKERS

This application is a continuation-in-part of Application Ser. No. 08/707,012, filed Sep. 3, 1996.

TECHNICAL FIELD

The invention relates to loudspeakers and more particularly to loudspeakers comprising panel-form acoustic radiating elements.

BACKGROUND ART

It is known from GB-A-2262861 to suggest a panel-form loudspeaker comprising:

a resonant multi-mode radiator element being a unitary sandwich panel formed of two skins of material with a spacing core of transverse cellular construction, wherein the panel is such as to have ratio of bending stiffness (B), in all orientations, to the cube power of panel mass per unit surface area ($\mu$) of at least 10;

a mounting means which supports the panel or attaches to it a supporting body, in a free undamped manner;

and an electro-mechanical drive means coupled to the panel which serves to excite a multi-modal resonance in the radiator panel in response to an electrical input within a 5 working frequency band for the loudspeaker.

DISCLOSURE OF INVENTION

Embodiments of the present invention use members of nature, structure and configuration achievable generally and/or specifically by implementing teachings of our co-pending application Ser. No. 08/707,018. Such members thus have capability to sustain and propagate input vibrational energy by bending waves in operative area(s) extending transversely of thickness often but not necessarily to edges of the member(s); are configured with or without anisotropy of bending stiffness to have resonant mode vibration components distributed over said area(s) beneficially for acoustic coupling with ambient air; and have predetermined preferential locations or sites within said area for transducer means, particularly operationally active or moving part(s) thereof effective in relation to acoustic vibrational activity in said area(s) and signals, usually electrical, corresponding to acoustic content of such vibrational activity. Uses are envisaged in co-pending application Ser. No. 08/707,012 for such members as or in "passive" acoustic devices without transducer means, such as for reverberation or for acoustic filtering or for acoustically "voicing" a space or room; and as or in "active" acoustic devices with transducer means, such as in a remarkably wide range of sources of sound or loudspeakers when supplied with input signals to be converted to said sound, or in such as microphones when exposed to sound to be converted into other signals.

This invention is particularly concerned with active acoustic devices in the form of loudspeakers. Members as above are herein called distributed mode acoustic radiators and are intended to be characterised as in the above co-pending patent application and/or otherwise as specifically provided herein.

The invention is a panel-form loudspeaker having a distributed mode acoustic radiator and a transducer coupled to vibrate the radiator to cause it to resonate, characterised by a second transducer coupled to the radiator to produce a signal in response to resonance of the radiator due to incident acoustic energy. The distributed mode acoustic radiator may be mounted in a surrounding frame by means of an interposed resilient suspension.

The panel-form loudspeaker may be characterised by at least two said second transducers at spaced locations on the radiator.

The panel-form loudspeaker may be characterised by a further transducer on the radiator to produce a signal in response to resonance of the radiator due to incident acoustic energy, and by means for comparing the signal generated by the said further transducer with that of those a stiff lightweight panel having a cellular core sandwiched between skins. The suspension may be attached to the edge of the panel. The first and second transducers may be mounted wholly and exclusively on the radiator. At least two said second transducers may be provided at predetermined preferential locations or sites on the radiator. A further transducer may be provided on the radiator at a predetermined location or site to produce a signal in response to resonance of the radiator due to incident acoustic energy, and means may be provided for comparing the signal generated by the said further transducer with that of those generated by the said second transducer(s). The comparison means may comprise a signal receiver and conditioner and signal output means.

BRIEF DESCRIPTION OF DRAWINGS

The invention is diagrammatically illustrated, by way of example, in the accompanying drawings, in which.

BEST MODES FOR CARRYING OUT THE INVENTION

Figure 1:
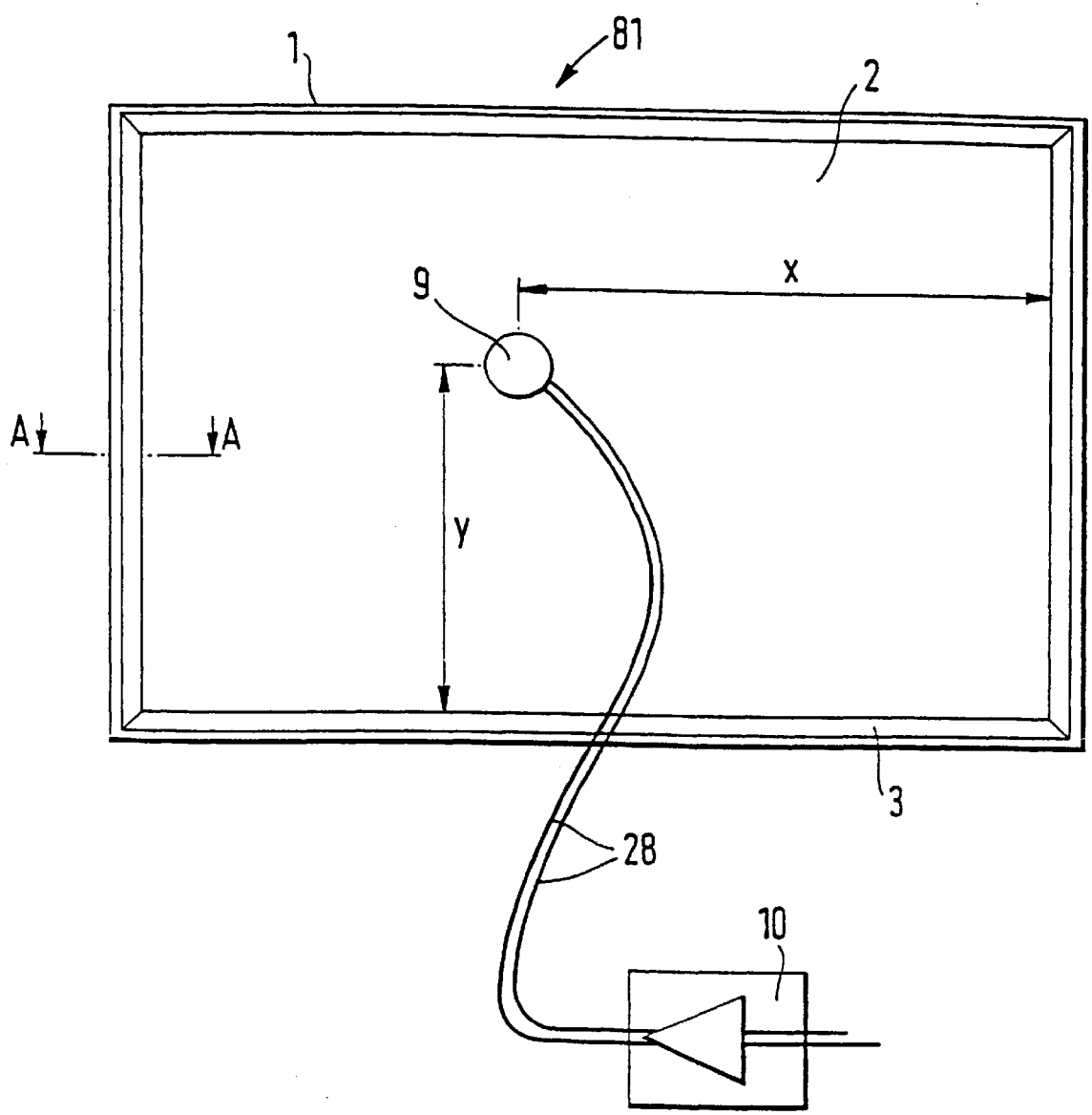
FIG. 1 is a diagram showing a distributed-mode loudspeaker as described and claimed in our co-pending application Ser. No. 08/707,012.

Referring to FIG. 1 of the drawings, there is shown a panel-form loudspeaker (81) of the kind described and claimed in our co-pending application Ser. No. 08/707,012 comprising a rectangular frame (1) carrying a resilient suspension (3) round its inner periphery which supports a distributed mode sound radiating panel (2). A transducer (9) e.g as described in detail with reference to our co-pending application Ser. Nos. 09/011,773, 09/011,770, and 09/011,831, is mounted wholly and exclusively on or in the panel (2) at a predetermined location defined by dimensions x and y, the position of which location is calculated as described in our co-pending application Ser. No. 08/707,012, to launch bending waves into the panel to cause the panel to resonate to radiate an acoustic output.

The transducer (9) is driven by a signal amplifier (10), e.g. an audio amplifier, connected to the transducer by conductors (28). Amplifier loading and power requirements can be entirely normal, similar to conventional cone type speakers, sensitivity being of the order of 86–88 dB/watt under room loaded conditions. Amplifier load impedance is largely resistive at 6 ohms, power handling 20–80 watts. Where the panel core and/or skins are of metal, they may be made to act as a heat sink for the transducer to remove heat from the motor coil of the transducer and thus improve power handling.

Figure 2A:
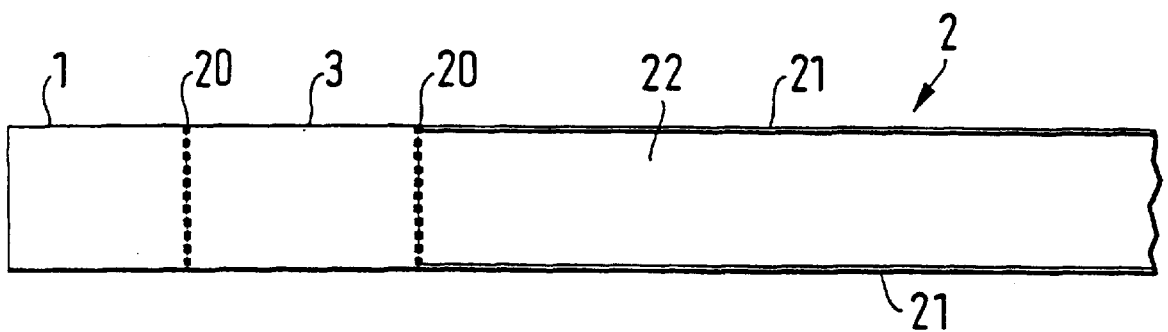
FIG. 2a is a partial section on the line A—A of FIG. 1.
Figure 2B:
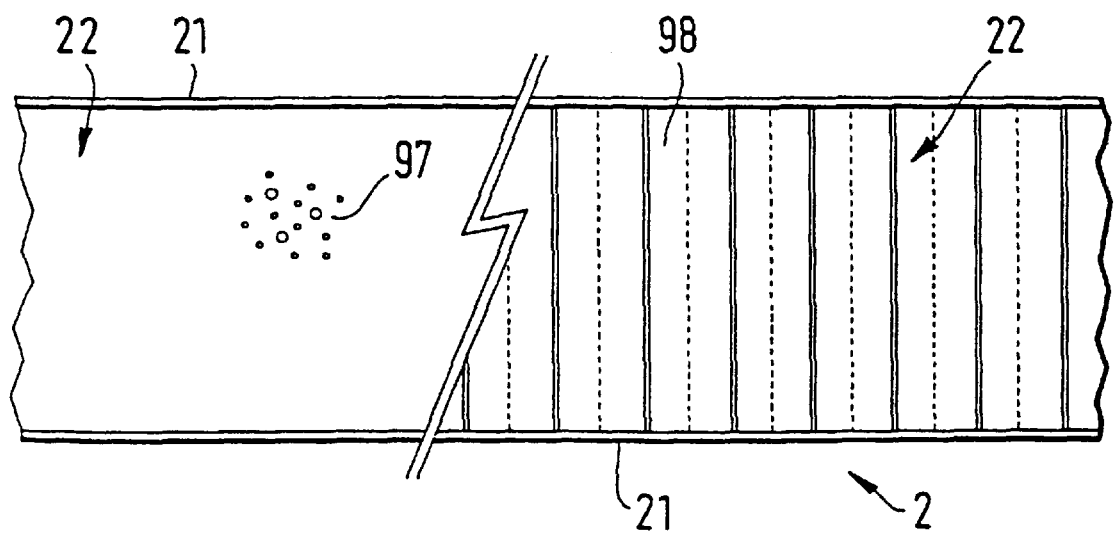
FIG. 2b is an enlarged cross-section through a distributed mode radiator of the kind shown in FIG. 2a and showing two alternative constructions.

FIGS. 2a and 2b are partial typical cross-sections through the loudspeaker (81) of FIG. 1. FIG. 2a shows that the frame (1), surround (3) and panel (2) are connected together by respective adhesive-bonded joints (20). Suitable materials for the frame include lightweight framing, e.g. picture framing of extruded metal e.g. aluminium alloy or plastics. Suitable surround materials include resilient materials such as foam rubber and foam plastics. Suitable adhesives for the joints (20) include epoxy, acrylic and cyano-acrylate etc. adhesives.

FIG. 2b illustrates, to an enlarged scale, that the panel (2) is a rigid lightweight panel having a core (22) e.g. of a rigid plastics foam (97) e.g. cross linked polyvinylchloride or a cellular matrix (98) i.e. a honeycomb matrix of metal foil, plastics or the like, with the cells extending transversely to the plane of the panel, and enclosed by opposed skins (21) e.g. of paper, card, plastics or metal foil or sheet. Where the skins are of plastics, they may be reinforced with fibres e.g. of carbon, glass, Kevlar (RTM) or the like in a manner known per se to increase their modulus.

Envisaged skin layer materials and reinforcements thus include carbon, glass, Kevlar (RTM), Nomex (RTM) i.e. aramid etc. fibres in various lays and weaves, as well as paper, bonded paper laminates, melamine, and various synthetic plastics films of high modulus, such as Mylar (RTM), Kaptan (RTM), polycarbonate, phenolic, polyester or related plastics, and fibre reinforced plastics, etc. and metal sheet or foil. Investigation of the Vectra grade of liquid crystal polymer thermoplastics shows that they may be useful for the injection moulding of ultra thin skins or shells of smaller size, say up to around 30 cm diameter. This material self forms an orientated crystal structure in the direction of injection, a preferred orientation for the good propagation of treble energy from the driving point to the panel perimeter.

Additional such moulding for this and other thermoplastics allows for the mould tooling to carry location and registration features such as grooves or rings for the accurate location of transducer parts e.g. the motor coil, and the magnet suspension. Additionally with some weaker core materials it is calculated that it would be advantageous to increase the skin thickness locally e.g. in an area or annulus up to 150% of the transducer diameter, to reinforce that area and beneficially couple vibration energy into the panel. High frequency response will be improved with the softer foam materials by this means.

Envisaged core layer materials include fabricated honeycombs or corrugations of aluminium alloy sheet or foil, or Kevlar (RTM), Nomex (RTM), plain or bonded papers, and various synthetic plastics films, as well as expanded or foamed plastics or pulp materials, even aerogel metals if of suitably low density. Some suitable core layer materials effectively exhibit usable self-skinning in their manufacture and/or otherwise have enough inherent stiffness for use without lamination between skin layers. A high performance cellular core material is known under the trade name 'Rohacell' which may be suitable as a radiator panel and which is without skins. In practical terms, the aim is for an overall lightness and stiffness suited to a particular purpose, specifically including optimising contributions from core and skin layers and transitions between them.

Several of the preferred formulations for the panel employ metal and metal alloy skins, or alternatively a carbon fibre reinforcement. Both of these, and also designs with an alloy Aerogel or metal honeycomb core, will have substantial radio frequency screening properties which should be important in several EMC applications. Conventional panel or cone type speakers have no inherent EMC screening capability.

In addition the preferred form of piezo and electro dynamic transducers have negligible electromagnetic radiation or stray magnetic fields. Conventional speakers have a large magnetic field, up to 1 metre distant unless specific compensation counter measures are taken.

Where it is important to maintain the screening in an application, electrical connection can be made to the conductive parts of an appropriate DML panel or an electrically conductive foam or similar interface may be used for the edge mounting.

The suspension (3) may damp the edges of the panel (2) to prevent excessive edge movement of the panel. Additionally or alternatively, further damping may be applied, e.g. as patches, bonded to the panel in selected positions to damp excessive movement to distribute resonance equally over the panel. The patches may be of bitumen-based material, as commonly used in conventional loudspeaker enclosures or may be of a resilient or rigid polymeric sheet material. Some materials, notably paper and card, and some cores may be self-damping. Where desired, the damping may be increased in the construction of the panels by employing resiliently setting, rather than rigid setting adhesives.

Effective said selective damping includes specific application to the panel including its sheet material of means permanently associated therewith. Edges and corners can be particularly significant for dominant and less dispersed low frequency vibration modes of panels hereof. Edge-wise fixing of damping means can usefully lead to a panel with its said sheet material fully framed, though their corners can often be relatively free, say for desired extension to lower frequency operation. Attachment can be by adhesive or self-adhesive materials. Other forms of useful damping, particularly in terms of more subtle effects and/or mid- and higher frequencies can be by way of suitable mass or masses affixed to the sheet material at predetermined effective medial localised positions of said area.

An acoustic panel as described above is bi-directional. The sound energy from the back is not strongly phase related to that from the front. Consequently there is the benefit of overall summation of acoustic power in the room, sound energy of uniform frequency distribution, reduced reflective and standing wave effects and with the advantage of superior reproduction of the natural space and ambience in the reproduced sound recordings.

While the radiation from the acoustic panel is largely non-directional, the percentage of phase related information increases off axis. For improved focus for the phantom stereo image, placement of the speakers, like pictures, at the usual standing person height, confers the benefit of a moderate off-axis placement for the normally seated listener optimising the stereo effect. Likewise the triangular left/right geometry with respect to the listener provides a further angular component. Good stereo is thus obtainable.

There is a further advantage for a group of listeners compared with conventional speaker reproduction. The intrinsically dispersed nature of acoustic panel sound radiation gives it a sound volume which does not obey the inverse square law for distance for an equivalent point source. Because the intensity fall-off with distance is much less than predicted by inverse square law then consequently for off-centre and poorly placed listeners the intensity field for the panel speaker promotes a superior stereo effect compared to conventional speakers. This is because the off-centre placed listener does not suffer the doubled problem due to proximity to the nearer speaker; firstly the excessive increase in loudness from the nearer speaker, and then the corresponding decrease in loudness from the further loudspeaker.

There is also the advantage of a flat, lightweight panel-form speaker, visually attractive, of good sound quality and requiring only one transducer and no crossover or a full range sound from each panel diaphragm.

Figure 3:
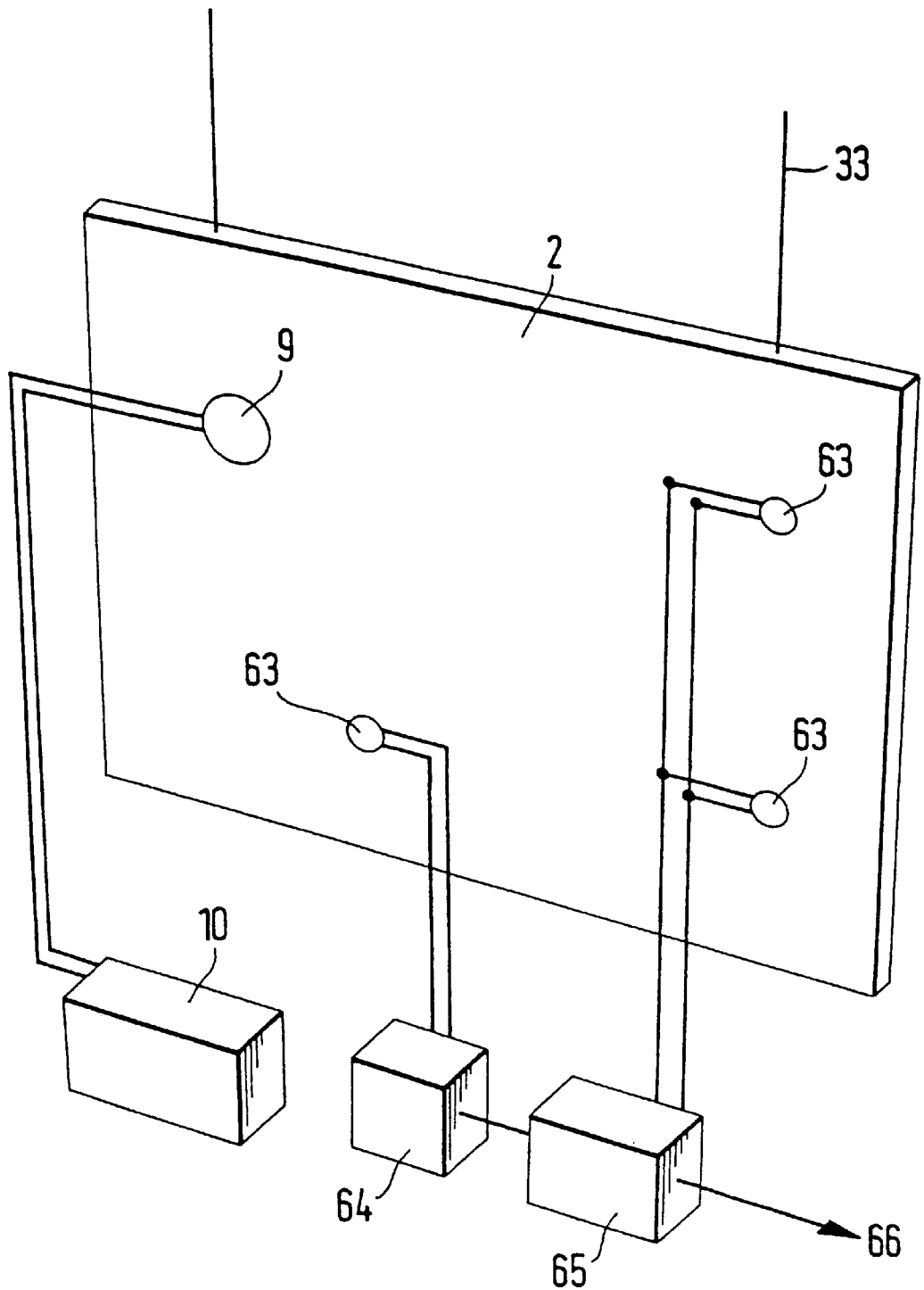
FIG. 3 is a diagram of an embodiment of distributed-mode loudspeaker microphone according to the present invention.

FIG. 3 illustrates a distributed mode panel (2) according to the present invention e.g. of the kind shown in FIGS. 1 and 2, intended for use both as a loudspeaker and as a sound receiver or microphone, e.g. for use in an interactive environment. Although not shown in FIG. 3, the panel (2) is mounted in a surrounding frame (1) and is attached to the frame via a resilient suspension (3) in the manner shown in FIGS. 1 and 2. The frame is suspended on a pair of wires (33), e.g. from a ceiling or on a floor standing frame (not shown).

The panel is driven to resonate and produce an acoustic output by a transducer (9) of the kind described above with reference to our co-pending application Ser. No. 09/011,773, 09/011,770, and 09/0011,831 which in turn is connected to and driven by an amplifier (10).

Figure 4:
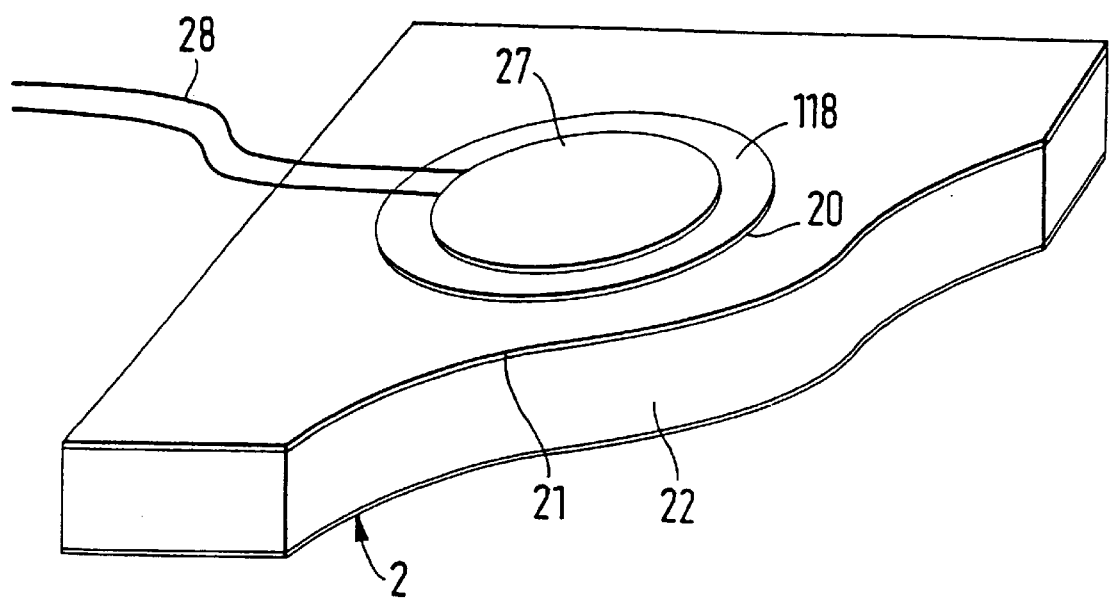
FIG. 4 is a perspective view of a piezo-electric transducer.

The panel also carries a pair of vibration transducers (63) which may be piezo-electric transducers of the kind shown in FIG. 4 which are coupled in parallel to drive a signal receiver and conditioner (65) connected to an output (66). Another vibration transducer (63) on the panel (2), e.g. of the kind shown in FIG. 4, is coupled to drive a filter/correlator (64) the output from which is fed to the signal receiver and conditioner (65), to provide signal correction.

FIG. 4 shows a transducer (9) for a distributed mode panel (2) in the form of a crystalline disc-like piezo bender (27) mounted on a disc (118), e.g. of brass, which is bonded to a face of the panel (2), e.g. by an adhesive bond (20). In operation an acoustic signal applied to the transducer (9) via leads (28) will cause the piezo disc (27) to bend and thus locally resiliently deform the panel (2) to launch bending waves into the panel.

INDUSTRIAL APPLICABILITY

The invention thus provides a simple loudspeaker/microphone e.g. for use in an interactive environment.

What is claimed is:

1. A panel form combination loudspeaker/microphone comprising:

a member having selected values of certain physical parameters which enable the member to sustain and propagate input vibrational energy in a predetermined frequency range by a plurality of resonant bending wave modes in at least one operative area extending transversely of thickness such that the frequencies of the resonant bending wave modes along at least two conceptual axes of the operative area are interleaved and spread so that there are substantially minimal clusterings and disparities of spacings of said frequencies, the member when resonating having a plurality of sites at which the number of vibrationally active resonance anti-nodes is relatively high;

a first transducer mounted on the member at one of said sites on the member, the first transducer being capable of vibrating the member in the predetermined frequency range to couple to and excite the resonant bending wave modes in the member and cause the member to resonate and produce an acoustic output; and a second transducer mounted on the member at one of said sites on the member for producing an output signal in response to resonance of the member due to incident acoustic energy, the second transducer adapted to couple to the resonant bending wave modes in the member and produce an output signal.

2. A panel-form loudspeaker according to claim 1, wherein the member (2) is mounted in a surrounding frame (1) by means of an interposed resilient suspension (3).

3. A panel-form loudspeaker according to claim 1 or claim 2, wherein the member (2) has a cellular core (22) sandwiched between skins (21).

4. A panel-form loudspeaker according to claim 2, wherein the suspension (3) is attached to the edge of the panel (2).

5. A panel-form loudspeaker according to claim 1 or claim 4, wherein the first and second transducers (9,63) are mounted wholly and exclusively on the member.

6. A panel-form loudspeaker according to claim 1, wherein at least two said second transducers (63) are mounted at separate ones of said sites on the member.

7. A panel-form loudspeaker according to claim 6, further comprising a further transducer (63) on the member at another one of said sites to produce a signal in response to resonance of the member due to incident acoustic energy, and means (64, 65) for comparing the signal generated by the said further transducer with those generated by the said second transducer(s).

8. A panel-form loudspeaker according to claim 7, wherein the comparison means comprises a signal receiver and conditioner (65) and signal output means (66).

9. A loudspeaker system comprising:

a member having selected values of certain physical parameters which enable the member to sustain and propagate input vibrational energy in a predetermined frequency range by a plurality of resonant bending wave modes in at least one operative area extending transversely of thickness such that the frequencies of the resonant bending wave modes along at least two conceptual axes of the operative area are interleaved and spread so that there are substantially minimal clusterings and disparities of spacings of said frequencies, the member when resonating having a plurality of sites at which the number of vibrationally active resonance anti-nodes is relatively high;

an amplifier for amplifying a source signal;

a first transducer coupled to the amplifier and mounted on the member at one of said sites on the member, the first transducer being capable of vibrating the member in the predetermined frequency range to couple to and excite the resonant bending wave modes in the member in response to the amplified source signal and cause the member to resonate and produce an acoustic output;

a second transducer mounted on the member at one of said sites on the member for producing an output signal in response to resonance of the member due to incident acoustic energy, the second transducer adapted to couple to the resonant bending wave modes in the member and produce an output signal; and a signal receiver coupled to the second transducer for treating said output signal.

10. A panel-form loudspeaker according to claim 9, wherein the member is mounted in a surrounding frame by means of an interposed resilient suspension.

11. A panel-form loudspeaker according to claim 10, wherein the suspension is attached to the edge of the panel.

12. A panel-form loudspeaker according to claim 10 or claim 11, wherein the first and second transducers are mounted wholly and exclusively on the member.

13. A panel-form loudspeaker according to claim 9 or claim 10, wherein the member has a cellular core sandwiched between skins.

14. A panel-form loudspeaker according to claim 10, wherein at least two said second transducers are mounted at separate ones of said sites on the member.

15. A panel-form loudspeaker according to claim 14, further comprising a further transducer on the member at another one of said sites to produce a signal in response to resonance of the member due to incident acoustic energy, and means for comparing the signal generated by the said further transducer with those generated by the said second transducer(s).

16. A panel-form loudspeaker according to claim 15, wherein the comparison means comprises a signal receiver and conditioner and signal output means.

* * * * *

UNITED STATES PATENT AND TRADEMARK OFFICE
CERTIFICATE OF CORRECTION

PATENT NO.   : 6,198,831 B1
DATED        : March 6, 2001
INVENTOR(S)  : Azima et al.

It is certified that error appears in the above-identified patent and that said Letters Patent is hereby corrected as shown below:

Title page,
Item [56], References Cited, please insert the following under U.S. PATENT DOCUMENTS:
-- 5,748,758  *  1/1996    Menasco, Jr. et al. .......381/176
   4,751,419  *  12/1986   Takahata ................310/324
   5,838,805  *  11/1995   Warnaka et al. ..........381/190 --.

Please insert the following under FOREIGN PATENT DOCUMENTS:
-- 2,246,684 A  *  4/1990      (GB) --.

Column 1,
Line 33, delete "08/707,018" and substitute therefor -- 08/707,012 --.

Column 5,
Line 18, delete "09/ 0011,831" and substitute therefor -- 09/011,831 --

Signed and Sealed this

Eleventh Day of December, 2001

Attest:

NICHOLAS P. GODICI
*Attesting Officer*    *Acting Director of the United States Patent and Trademark Office*